United States Patent
Takano

[11] Patent Number: 5,835,804
[45] Date of Patent: Nov. 10, 1998

[54] CAMERA

[75] Inventor: Takao Takano, Kanagawa-ken, Japan

[73] Assignee: Canon Kabushiki Kaisha, Tokyo, Japan

[21] Appl. No.: 777,566

[22] Filed: Dec. 31, 1996

Related U.S. Application Data

[63] Continuation of Ser. No. 355,640, Dec. 14, 1994, abandoned.

[30] Foreign Application Priority Data

Dec. 28, 1993 [JP] Japan .................................. 5-337152

[51] Int. Cl.$^6$ ........................................................ G03B 1/00
[52] U.S. Cl. ............................................................ 396/410
[58] Field of Search .................................... 396/406, 410

[56] References Cited

U.S. PATENT DOCUMENTS 5,049,909  9/1991  Ishikawa et al. ..................... 354/173.1
5,249,009  9/1993  Tsuru et al. .......................... 354/173.1

Primary Examiner—David M. Gray
Attorney, Agent, or Firm—Robin, Blecker & Daley

[57] ABSTRACT

A camera is provided with a first rewinding part arranged to rewind a film at a first speed, a second rewinding part arranged to rewind the film at a second speed which is faster than the first speed, and a switch part arranged to permit change-over of the mode of film rewinding from film rewinding by the first rewinding part to film rewinding by the second rewinding part while the film is in process of being rewound by the first rewinding part.

25 Claims, 10 Drawing Sheets

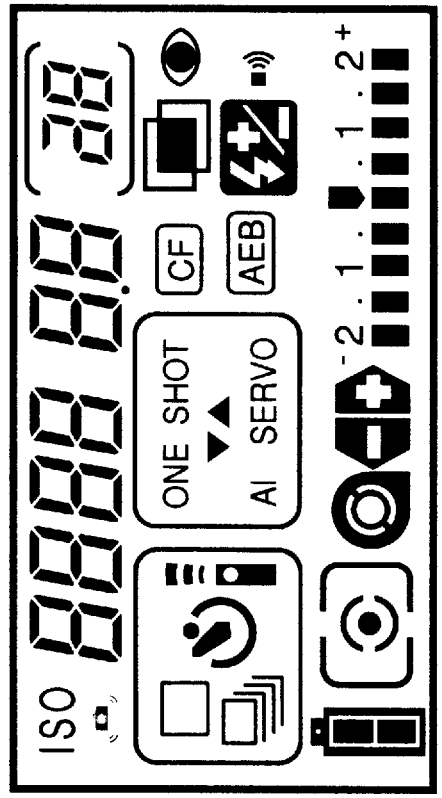
F I G.5(a)
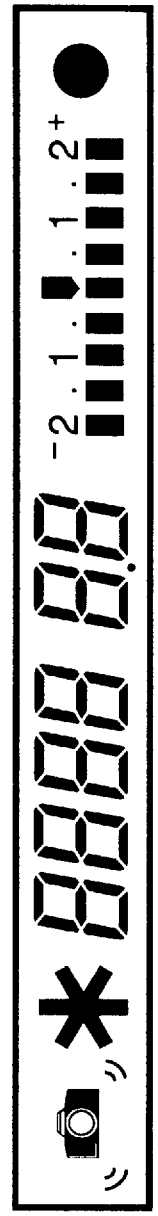
F I G.5(b)

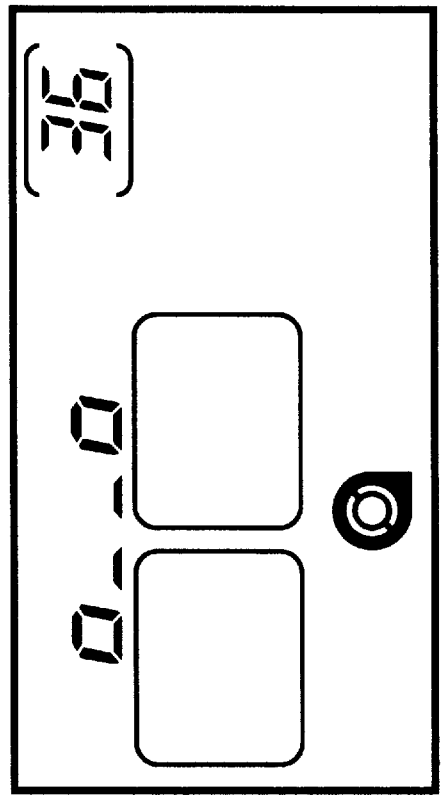
F I G. 6(a)
F I G. 6(b)

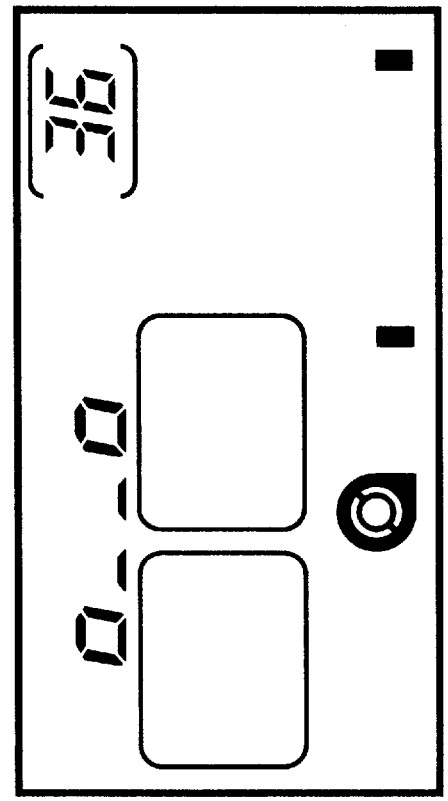
FIG.7(a)
FIG.7(b)

CAMERA

This is a continuation of prior application Ser. No. 08/355,640, filed Dec. 14, 1994, now abandoned.

BACKGROUND OF THE INVENTION

1. Field of the Invention

This invention relates to a camera having a film rewinding device.

2. Description of the Related Art

The film rewinding devices which have heretofore been arranged to use motors generate a loud noise from the motors and gears. Such a film rewinding noise in a quiet environment is a nuisance to people around the camera. To solve this problem, various measures have been taken. For example, there has been provided setting means for setting the camera in a mode in which no automatic film rewinding is performed when the last frame portion of film has been exposed. In another solution, the film rewinding speed is arranged to be lowered to quietly carry out film rewinding (hereinafter referred to as a silent rewinding mode). It is also known to provide the camera with means for setting change-over between the silent rewinding mode and a normal high speed rewinding mode (hereinafter referred to as a high speed rewinding mode).

In the example of the conventional arrangement mentioned above, however, the change-over from one mode over to the other has been impossible after commencement of film rewinding. The impossibility of change-over has brought about the following problems.

(i) In case where the film must be quickly replaced, if a film rewinding process begins in the silent rewinding mode, a shutter opportunity would be missed because the film rewinding process in the silent rewinding mode takes too much time before the film is replaced. In addition to this, since no sound is heard in the silent rewinding mode, if the operator attempts to carry on a picture taking operation without knowing the commencement of a film rewinding process, a shutter opportunity also might be missed as the shutter would not respond to the attempt as the camera is in process of film rewinding.

(ii) In a quiet environment, the camera might become a nuisance to people around it by starting film rewinding with sudden emission of a loud noise upon completion of an exposure action on the last frame portion of the film. This trouble often happens when the camera operator fails, by oversight or negligence, to do a necessary setting operation in anticipation of the environment in which the camera is to be used.

SUMMARY OF THE INVENTION

It is one aspect of this invention to provide a camera which is of the kind having a low-speed film rewinding mode and a high-speed film rewinding mode and is arranged to permit change-over of the film rewinding mode to a high-speed rewinding mode while the camera is in process of the low-speed rewinding mode, so that the above-stated problems of the prior art can be solved by carrying out film rewinding in one of the modes selected according to the camera operating environment.

The above and other aspect and features of this invention will become apparent from the following detailed description of embodiments thereof taken in connection with the accompanying drawings.

BRIEF DESCRIPTION OF THE DRAWINGS

FIGS. 5(a) and 5(b) show a display device shown in FIG. 1. FIG. 5(a) shows a display part arranged outside of the body of the camera and FIG. 5(b) a display part arranged within a viewfinder.

FIGS. 6(a) and 6(b) show displays made by the display device of FIG. 1 while the camera is in process of film rewinding. FIG. 6(a) shows the display part arranged outside of the camera body and FIG. 6(b) the display part arranged within the viewfinder.

FIGS. 7(a) and 7(b) show displays made by a display device of the second embodiment while a film rewinding action is in process. FIG. 7(a) shows a display part arranged outside of the camera body and FIG. 7(b) a display part arranged within a viewfinder.

FIG. 8(a) shows the external display part and FIG. 8(b) the display part within the viewfinder.

FIG. 9(a) shows the external display part and FIG. 9(b) the display part within the viewfinder.

DETAILED DESCRIPTION OF THE PREFERRED EMBODIMENTS

Figure 1:
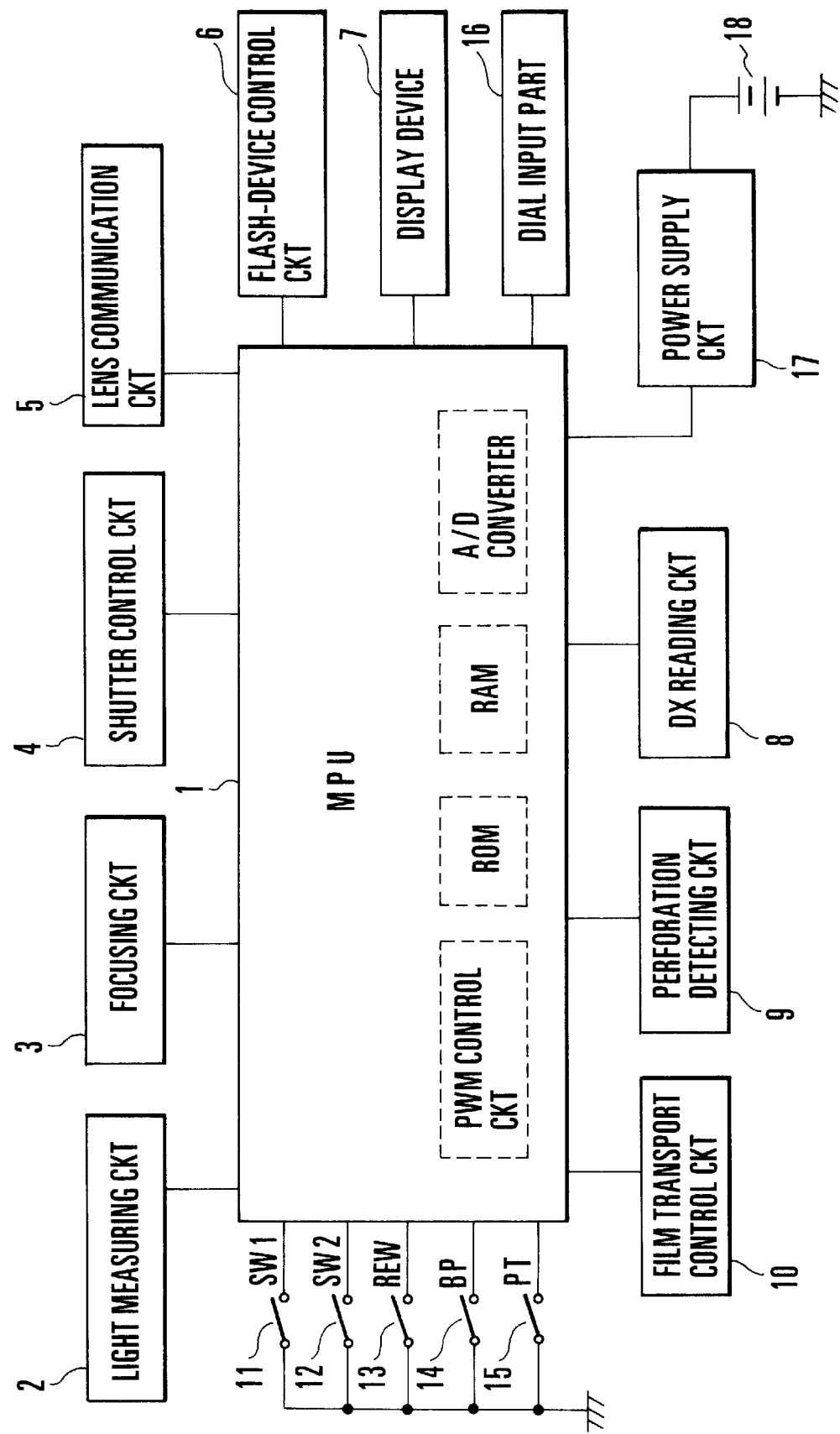
FIG. 1 is a block diagram showing a camera which is arranged as a first embodiment of this invention.

The details of this invention are described below through its embodiments shown in the drawings.

FIG. 1 is a block diagram showing a camera arranged according to this invention as a first embodiment thereof. Referring to FIG. 1, the camera is provided with a control unit (MPU) 1. The control unit, or MPU, 1 is formed by a one-chip microcomputer including therein a ROM, a RAM, an A/D converter, a PWM circuit, etc. The control unit 1 performs overall control over the actions of the camera according to a program stored in the ROM. A light measuring circuit 2 is arranged to measure light for deciding an amount of exposure to be made. A focusing circuit 3 is arranged to detect a focus position and to shift the focal point of a photo taking lens as necessary. A shutter control circuit 4 is arranged to perform an exposure action by controlling the opening and closing operation of a shutter. A lens communication circuit 5 is arranged to control a photo taking lens by conducting communication with the photo taking lens. A flash device control circuit 6 is arranged to control flashing of a flash device. A display device 7 is arranged to display information of varied kinds. A DX reading circuit 8 is arranged to read a DX code of a film. A perforation detecting circuit 9 is arranged to detect the perforation of the film for indexing frames. A film transport control circuit 10 which includes a motor is arranged to control a driving action on the film. A switch (SW1) 11 is provided for commencement of light measuring and distance measuring actions. A release switch (SW2) 12 is provided for commencement of a release action. A rewinding switch (REW) 13 is provided for forcibly rewinding the film when the film has not been exposed to the last frame portion of it. The rewinding switch 13 is arranged to be turned on by operating a (film) rewinding button. A back lid detecting switch (BP) 14 is provided for detecting the open or closed state of the back lid of the camera. A film cartridge detecting switch (PT) 15 is provided for detecting the presence or absence of a film cartridge. A dial input part 16 is arranged to operate by generating two-phase pulses. A power supply circuit 17 is arranged to supply power to each part of the camera. A battery 18 serves as a power source for the whole camera.

FIGS. 5(a) and 5(b) show the display device 7 of the first embodiment as in a state of having all the display segments of it lighted up. The display device 7 includes an outside display part which is arranged to make a display outside of the camera body showing some of matters shown in FIG. 5(a) as applicable and an inside display part which makes a display within a viewfinder showing some of matters shown in FIG. 5(b) as applicable.

Figure 2:
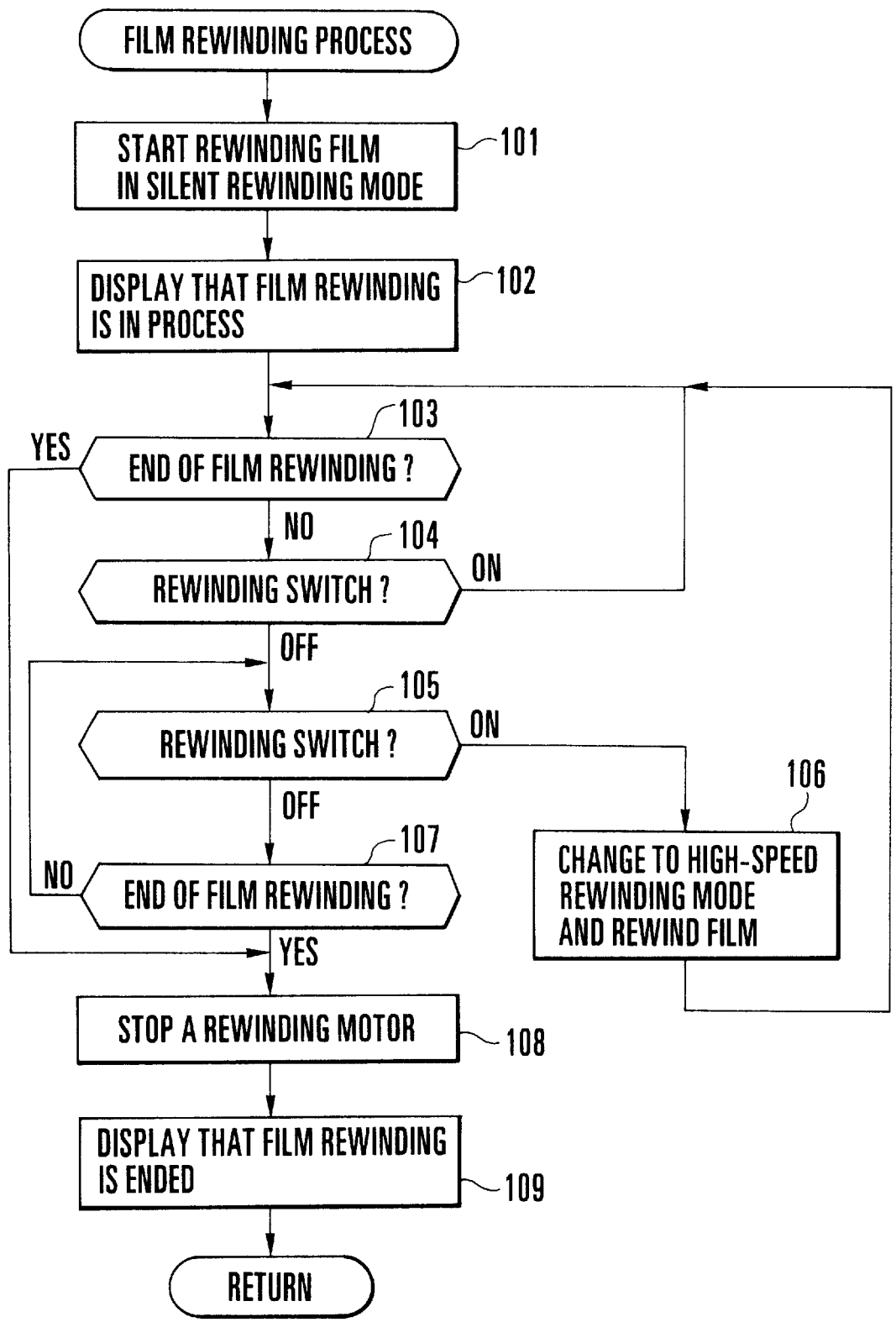
FIG. 2 is a flow chart showing the operation of the camera shown in FIG. 1.

FIG. 2 shows in a flow chart the operation of the camera which is arranged as described above. What is shown in the flow chart is a film rewinding subroutine to be executed either when the rewinding switch 13 is pushed or when all the frame portions of the film loaded on the camera have been exposed for taking pictures.

At a step 101, film rewinding begins in a silent rewinding mode when this subroutine is called. At this moment, the duty ratio of the PWM control circuit which is disposed within the MPU 1 is determined by A/D (analog-to-digital) converting the voltage of the battery 18 through the A/D converter which is also disposed within the MPU 1.

The duty ratio is computed as follows:

duty ratio=(2.7/battery voltage×100 (%)

A rewinding motor is rotated at this duty ratio and film begins to be rewound. At a step 102, the display device 7 displays that the camera is in process of film rewinding as shown in FIGS. 6(a) and 6(b). These displays vary until completion of the process of film rewinding in a manner as represented by FIGS. 11(a) to 11(d) in the order of FIGS. 11(a)–11(b)–11(c)–11(d)–11(a) 11(b)—. At a step 103, a check is made through the perforation detecting circuit 9 for the end of the film rewinding process. At the end of film rewinding, the film is completely rewound to the inside of the film cartridge and the movement of the perforation becomes no longer detectable by the perforation detecting circuit 9. If the film rewinding process is found not to have come to an end, the flow of operation comes to a step 104. At the step 104, a check is made for the state of the rewinding switch 13. If the rewinding switch 13 is found to be in an on-state, the flow comes back to the step 103. In other words, if the rewinding switch 13 is in its on-state immediately after the film rewinding process, the flow repeats the steps 103 and 104 until the rewinding switch 13 is turned off.

When the rewinding switch is turned off, the flow comes to a step 105 to make a check again for the state of the rewinding switch 13. If the rewinding switch is found in its off-state, the flow comes to a step 107. At the step 107, a check is made to find if the film rewinding process has come to an end. If not, the flow comes back to the step 105.

Figure 10:
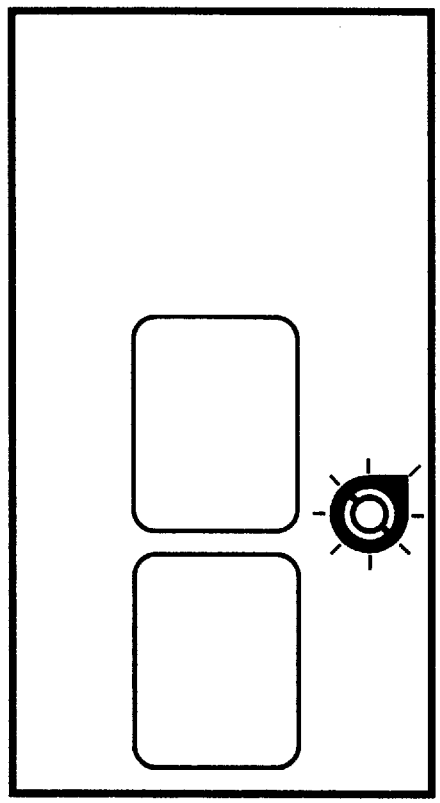
FIG. 10 shows a display of end of film rewinding made by the display device shown in FIG. 1.
Figures 11A, 11B, 11C, 11D:
FIGS. 11(a) to 11(d) show the details of display made by the display device of FIG. 1 while the camera is in process of film rewinding.

The steps 105 and 107 are repeated before the film rewinding process comes to an end and waits until the rewinding switch 13 is turned on. When the rewinding switch 13 is found to be turned on at the step 105, the flow comes to a step 106. At the step 106, the silent rewinding mode is changed over to a high speed rewinding mode. The PWM control circuit disposed within the MPU 1 is brought to a stop. The flow comes back to the step 103 to repeat the sequence of processes of waiting for turning off of the rewinding switch 13. When the film rewinding process is found to have come to an end at the step 103 or 107, the flow comes to a step 108. At the step 108, the rewinding motor is brought to a stop. At a step 109, a display is made to show that the film rewinding process has come to an end as shown in FIG. 10.

In the case of the first embodiment, film rewinding is arranged to begin in the silent rewinding mode and to be shifted to the high speed rewinding mode when the rewinding switch 13 is pushed.

The flow of operation which is arranged to wait temporarily for turning off of the rewinding switch 13 at the step 104 may be changed to a flow in which the flow comes to the step 106 when the rewinding switch 13 is continuously pushed for a predetermined period of time.

Figure 3:
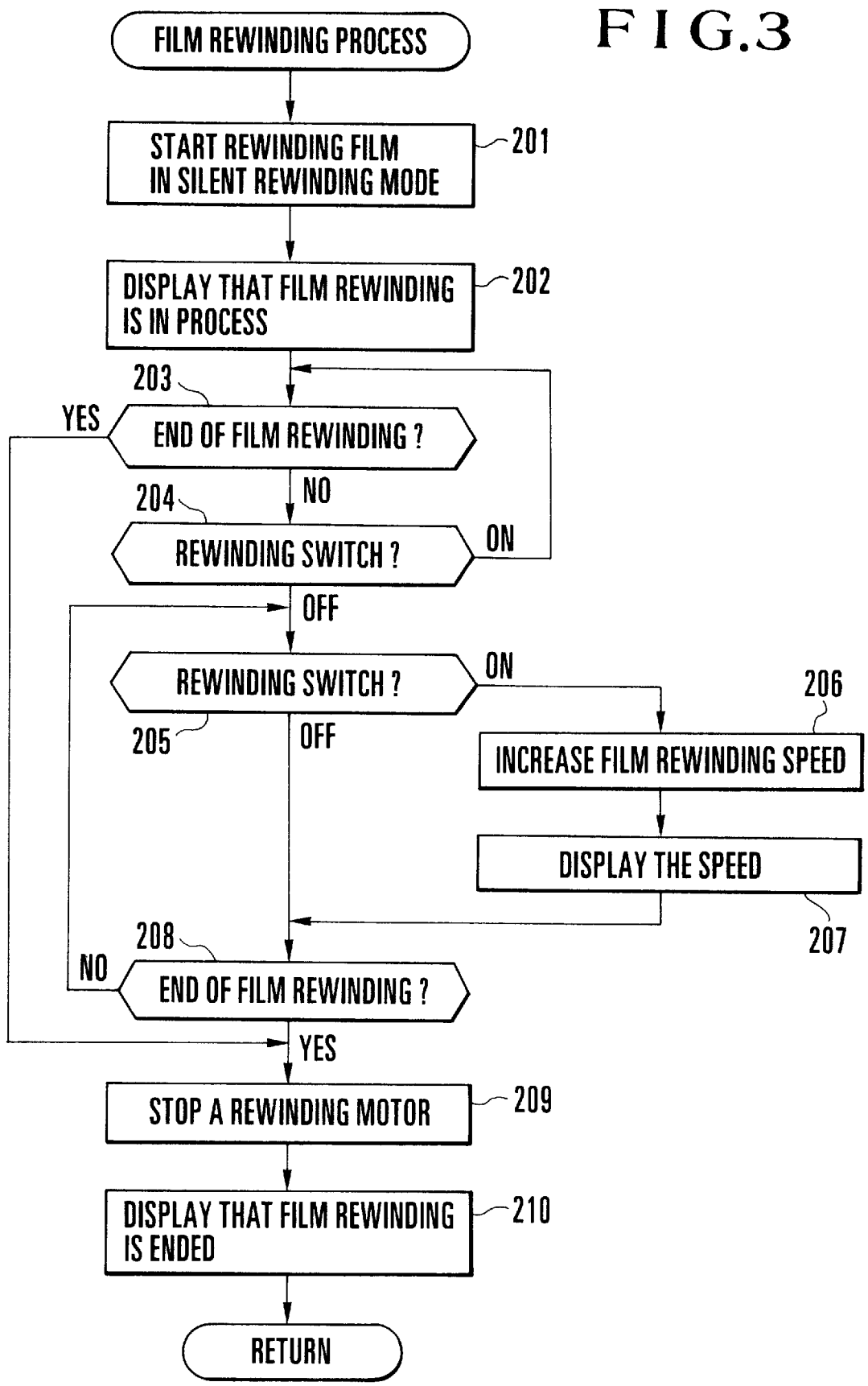
FIG. 3 is a flow chart showing the operation of a second embodiment of this invention.

FIG. 3 shows in a flow chart the operation of a second embodiment of this invention, which is arranged in the same manner as the first embodiment shown in FIG. 1. The flow chart shows a film rewinding process subroutine to be executed either when the rewinding switch 13 is turned on or when all the frame portions of the film with which the camera is loaded has been exposed.

At a step 201, when the subroutine is called, the film rewinding process begins in the silent rewinding mode. At this moment, the duty ratio of the PWM control circuit disposed within the MPU 1 is determined by A/D converting the voltage of-the battery 18 through the A/D converter disposed within the MPU 1. The duty ratio is computed as follows:

duty ratio=(2.7/battery voltage)×100 (%)

The rewinding motor begins to rotate at this duty ratio for film rewinding. At a step 202, the display device makes displays showing that the camera is in process of rewinding the film as shown in FIGS. 7(a) and 7(b). These displays vary, like the first embodiment, until the film rewinding process comes to an end as shown in FIGS. 11(a) to 11(d) in the order of FIGS. 11(a)–11(b) –11(c)–11(d)–11(a)–11(b) —. At a step 203, a check is made through the perforation detecting circuit 9 to find if the film rewinding process has come to an end. If not, the flow comes to a step 204. At the step 204, a check is made for the state of the rewinding switch 13. If the rewinding switch 13 is found to have been turned on, the flow comes back to the step 203. In other words, if the rewinding switch 13 is found to be in its on-state immediately after the commencement of film rewinding (thus indicating that the rewinding button is continuously pushed), the steps 203 and 204 are repeated until the rewinding switch is turned off. When the rewinding switch 13 is found in its off-state, the flow comes to a step 205 to make a check again for the state of the rewinding switch 13. If the rewinding switch is found to be in its off-state, the flow comes to a step 208 to make a check to find if the film rewinding process has come to an end. If not, the flow comes back to the step 205.

Figure 8A:
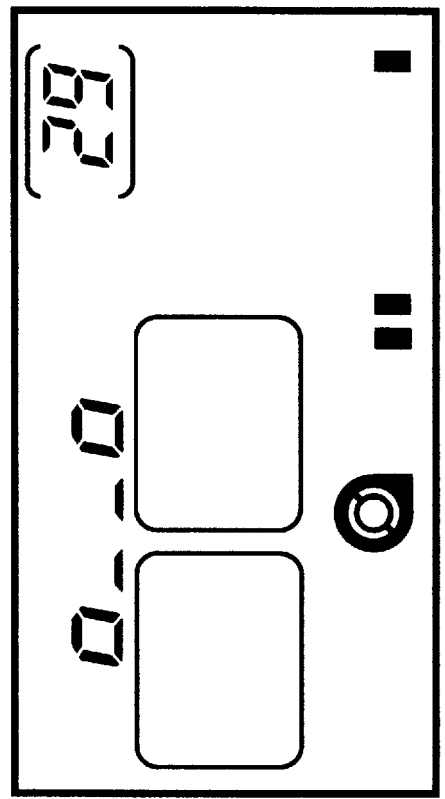
FIGS. 8(a) and 8(b) show displays of a film rewinding speed made by the display device of the second embodiment while the camera is in process of film rewinding.
Figure 8B:
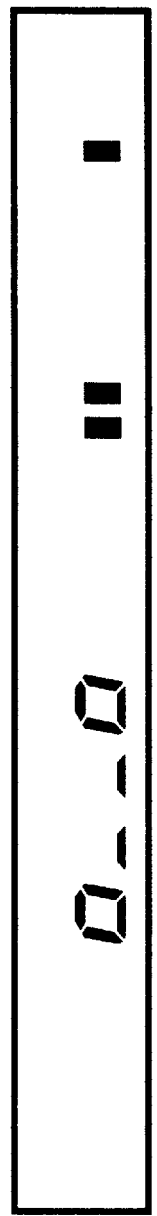

The steps 205 and 208 are repeated until the film rewinding process comes to an end and waits for turning on of the rewinding switch 13. When the rewinding switch 13 is found to be in its on-state at the step 205, the flow comes to a step 206. At the step 206, the duty ratio of the PWM control circuit disposed within the MPU 1 is raised by about 5% or thereabout. Then, the flow comes to a step 207. At the step 207, the display device 7 displays a speed with one dot added in the lower part of each of the displays as shown in FIGS. 8(a) and 8(b). The flow then comes to a step 208.

Figure 9A:
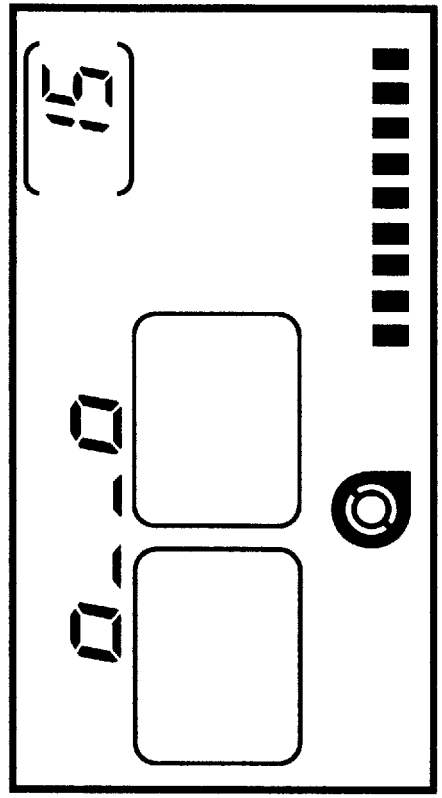
FIG. 9(a) and 9(b) show displays of the highest film rewinding speed made by the display device of the second embodiment.
Figure 9B:
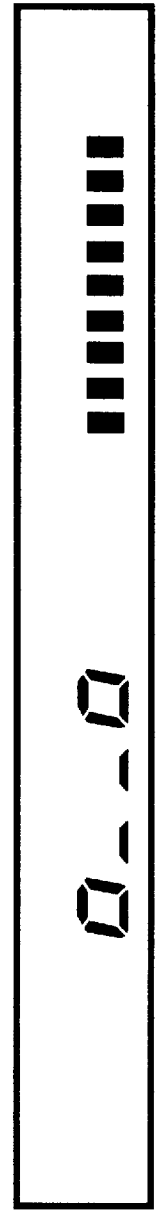

If the rewinding switch 13 continues to be in its on-state, the film rewinding speed accelerates gradually. When the rewinding switch is turned off, the speed ceases to accelerate and remains at the accelerated speed. FIGS. 9(a) and 9(b) show the speed displays which indicate a maximum speed of film rewinding attained with the rewinding switch 13 kept in its on-state.

When the film rewinding process is found to have come to an end at the step 203 or 208, the flow comes to a step 209 to bring the rewinding motor to a stop. At a step 210, the end of the film rewinding process is displayed in the same manner as the first embodiment.

In the case of the second embodiment, the film rewinding begins in the silent rewinding mode; the film rewinding speed can be accelerated if the rewinding switch is kept in its on-state by pushing the rewinding button; and the film rewinding speed is kept at the accelerated speed when the rewinding switch 13 is turned off.

The film rewinding arrangement may be set in such a way as to permit an input through the dial input part, for example, and to permit not only acceleration but also deceleration of the film rewinding speed.

The step 204 of waiting for turning off of the rewinding switch 13 may be changed to have the flow come to the step 206 when the rewinding switch 13 has remained in its on-state for a predetermined period of time.

Figure 4:
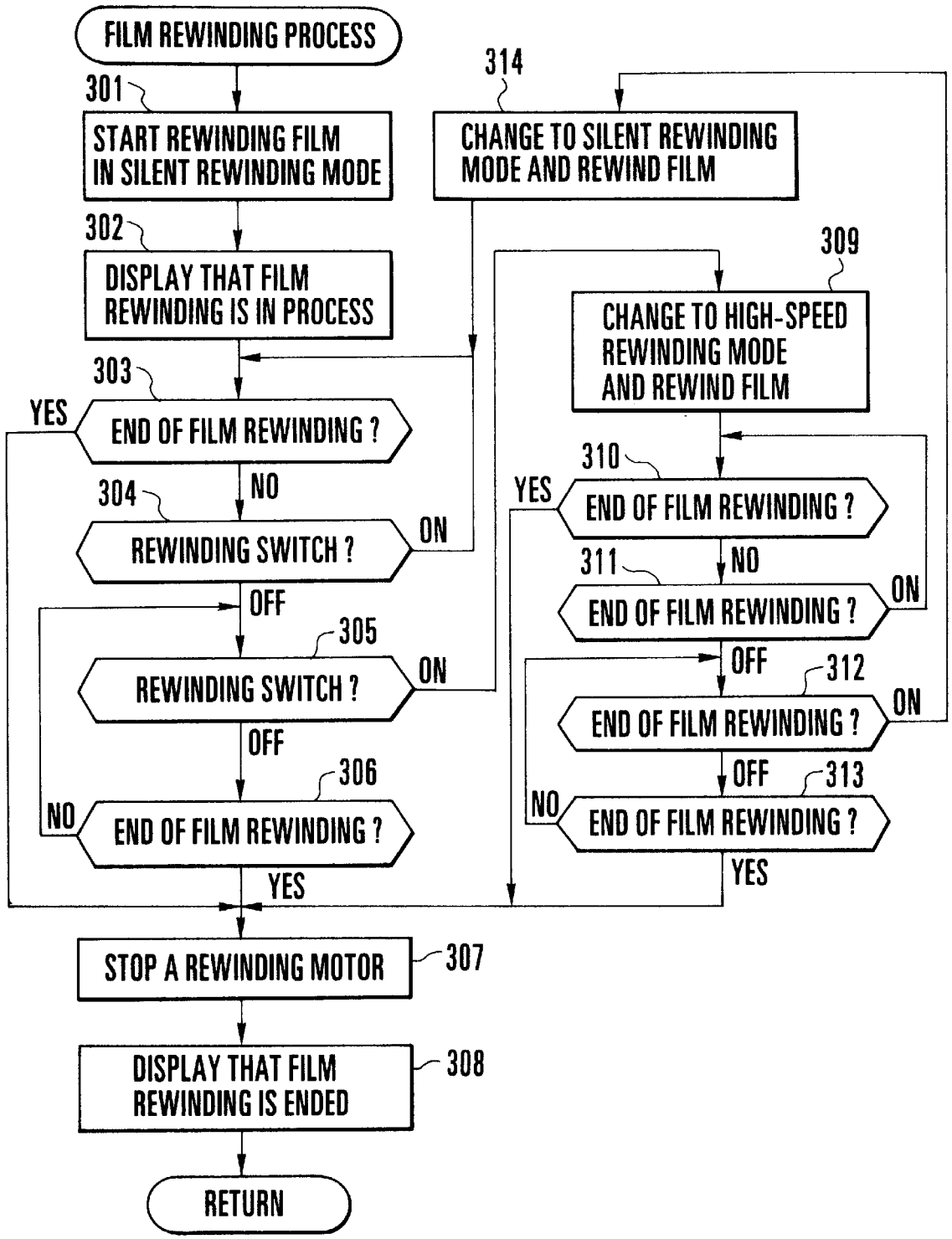
FIG. 4 is a flow chart showing the operation of a third embodiment of this invention.

FIG. 4 shows in a flow chart the operation of a third embodiment of this invention. The third embodiment is arranged in the same manner as the first embodiment. What is shown in FIG. 4 is a subroutine for a film rewinding process to be executed either when the rewinding switch 13 is turned on or when all the frame portions of the film loaded have been exposed.

When this subroutine is called, the flow of operation comes to a step 301. At the step 301, the film rewinding process begins in the silent rewinding mode. The duty ratio of the PWM control circuit disposed within the MPU 1 is determined by A/D converting the voltage of the battery 18 by the A/D converter which is also disposed within the MPU 1. The duty ratio is computed as follows:

duty ratio=(2.7/battery voltage)×100 (%)

The rewinding motor begins to rotate at this duty ratio for film rewinding. At a step 302, the display device 7 makes displays indicating that the camera is in process of film rewinding as shown in FIGS. 6(a) and 6(b). These displays vary as shown in FIGS. 11(a) to 11(d) in the order of FIGS. 11(a)–11(b)–11(c)–11(d)–11(a)–11(b) —. At a step 303, the perforation detecting circuit 9 is checked to find if the film rewinding process has come to an end. If not, the flow comes to a step 304. At the step 304, a check is made for the state of the rewinding switch 13. If the rewinding switch 13 is found in its on-state, the flow comes back to the step 303. In other words, if the rewinding switch 13 is found in its on-state immediately after the commencement of film rewinding, the steps 303 and 304 are repeated. If the rewinding switch 13 is found in an off-state at the step 304, the flow comes to a step 305. At the step 305, a check is made again for the state of the rewinding switch 13. If the rewinding switch 13 is found in its off-state, the flow comes to a step 306 to make a check to find if the film rewinding has come to an end. If not, the flow comes back to the step 305.

The steps 305 and 306 are repeated until the film rewinding comes to an end and the flow of operation waits for turning on of the rewinding switch 13. When the rewinding switch 13 is found to have been turned on at the step 305, the flow comes to a step 309. At the step 309, the film rewinding mode is changed over to the high speed rewinding mode. The PWM control circuit disposed within the MPU 1 is brought to a stop.

At a step 310, a check is made to find if the film rewinding has come to an end. If not, the flow comes to a step 311 to make a check for the state of the rewinding switch 13. The steps 310 and 311 are repeated until the rewinding switch 13 is turned off. When the rewinding switch 13 is found to have been turned off, the flow comes to a step 312. At the step 312, a check is made again for the state of the rewinding switch 13. If the rewinding switch 13 is found in its off-state, the flow comes to a step 313 to make a check for the end of the film rewinding. These steps 312 and 313 are repeated.

When the rewinding switch 13 is found to have been turned on at the step 312, the flow comes to a step 314. At the step 314, the rewinding mode is returned back to the silent rewinding mode. The flow then comes back to the step 303 for the sequence of processes of waiting for turning off of the rewinding switch 13.

When the end of the film rewinding is detected at the step 303, 306, 310 or 313, the flow of operation comes to a step 307 to bring the rewinding motor to a stop. At a step 308, a display is made to indicate the end of film rewinding as shown in FIG. 10.

The third embodiment is arranged such that the film rewinding process begins in the silent rewinding mode and the silent rewinding mode and the high speed rewinding mode are alternately changed from one over to the other every time the rewinding switch 13 is pushed.

In accordance with the arrangement of each of the embodiments described, film rewinding begins in a first mode, i.e., the silent rewinding mode in which the film is rewound at a low speed. This arrangement effectively precludes the possibility of having film rewinding begin in a second mode, i.e., the high speed rewinding mode which is too noisy in a place requiring quietness. In case where it is desired to quickly rewind an exposed film, the silent rewinding mode which is slow can be changed over to the high speed rewinding mode by simply operating an operation switch such as the rewinding switch after commencement of film rewinding. Further, since the film rewinding speed is selectable as desired between the speed of the first mode and that of the second mode, the film rewinding speed can be instantly set according to the environment in which the camera is operated.

Further, the display means which is arranged to inform the operator, at least through the viewfinder, of commencement of film rewinding and the speed of film rewinding reliably enables the operator to know that the camera is in process of film rewinding.

What is claimed is:

1. A camera comprising:

first rewinding means for rewinding a film at a first speed;

second rewinding means for rewinding the film at a second speed which is faster than the first speed;

control means for forcing camera use of said first rewinding means at least at the commencement of film rewinding and, thereafter, responsive to user demand, for continued film rewinding at each of said first and second film rewinding speeds; and change-over means which enables change over to film rewinding by said second rewinding means while the film is being rewound by said first rewinding means, said change-over means including a switch accessible exteriorly of the camera and the state of which is variable by operating from a first state to a second state the switch and the film rewinding by said first rewinding means being changed over to the film rewinding by said second rewinding means by varying the state of said switch, whereby the film rewinding by said second rewinding means is maintained even when the switch is subsequently changed from said second state to said first state.

2. A camera according to claim 1, wherein said first rewinding means and said second rewinding means include in common a microcomputer and film rewinding is performed selectively by using said first rewinding means or said second rewinding means in accordance with a control program provided for said microcomputer and in part implementing said control means.

3. A camera according to claim 1, wherein said change-over means includes a switch accessible exteriorly of the camera and the state of which is variable by operating the switch and the film rewinding by said first rewinding means is changed over to the film rewinding by said second rewinding means by varying the state of said switch.

4. A camera according to claim 2, wherein said change-over means includes a switch accessible exteriorly of the camera and the state of which is variable by operating the switch and the film rewinding by said first rewinding means is changed over to the film rewinding by said second rewinding means by varying the state of said switch.

5. A camera according to claim 4, wherein, when the state of said switch varies, said control program causes the film rewinding by said first rewinding means to be changed over to the film rewinding by said second rewinding means.

6. A camera according to claim 3, wherein a change in the state of said switch when said film is not being rewound commences the film rewinding.

7. A camera according to claim 1, further comprising an indication device which is arranged to indicate a speed at which the film is rewound.

8. A camera according to claim 7, wherein said indication device includes a display which is arranged within a viewfinder.

9. A camera comprising:
 rewinding means for rewinding a film, the film rewinding speed of said rewinding means being arranged to be variable;
 control means for forcing film rewinding at a first film rewinding speed at least at the commencement of film rewinding and, thereafter, responsive to user demand, for continued film rewinding at each of the variable film rewinding speeds; and
 change-over means arranged to change the film rewinding speed to a speed which is higher than said first film rewinding speed while the camera is in process of rewinding, said change-over means including a switch accessible exteriorly of the camera and the state of which is variable from a first state to a second state by operating the switch and the film rewinding at said first film rewinding speed being changed over to the film rewinding at said higher film rewinding speed by varying the state of said switch,
 whereby the film rewinding by said rewinding means at said higher rewinding speed is maintained even when the switch is subsequently chance from said second state to said first state.

10. A camera according to claim 9, wherein said first rewinding means and said second rewinding means include in common a microcomputer and the film rewinding speed is variable according to a control program which is provided for said microcomputer.

11. A camera according to claim 9, wherein said change-over means includes a switch accessible exteriorly of the camera and the state of which is variable by operating the switch and the film rewinding speed is changed to a higher speed by varying the state of said switch.

12. A camera according to claim 10, wherein said change-over means includes a switch accessible exteriorly of the camera and the state of which is variable by operating the switch and the film rewinding speed is changed to a higher speed by varying the state of said switch.

13. A camera according to claim 11, wherein a change in the state of said switch when said film is not being rewound commences the film rewinding.

14. A camera according to claim 11, wherein the film rewinding speed is arranged to be gradually increased by continuously varying the state of said switch.

15. A camera according to claim 9, further comprising an indication device which is arranged to indicate a speed at which the film is rewound.

16. A camera according to claim 15, wherein said indication device includes a display which is arranged within a viewfinder.

17. A camera comprising:
 first rewinding means for rewinding a film at a first speed;
 second rewinding means for rewinding the film at a second speed which is faster than the first speed;
 control means for forcing camera use of said first rewinding means at least at the commencement of film rewinding and, thereafter, responsive to user demand, for continued film rewinding at each of said first and second film rewinding speeds; and
 change-over means which enables change, while the film is being rewound, from the film rewinding by said first rewinding means over to the film rewinding by said second rewinding means and from the film rewinding by said second rewinding means over to the film rewinding by said first rewinding means, said change-over means including a switch accessible exteriorly of the camera and the state of which is variable by operating from a first state to a second state the switch and the film rewinding by each of said first and second rewinding means being changed over to the film rewinding by said other of said first and second rewinding means by varying the state of said switch,
 whereby the film rewinding by said second rewinding means is maintained even when the switch is subsequently changed from said second state to said first state.

18. A camera according to claim 17, wherein said first rewinding means and said second rewinding means include in common a microcomputer and film rewinding is performed selectively by using said first rewinding means or said second rewinding means in accordance with a control program provided for said microcomputer and in part implementing said control means.

19. A camera according to claim 17, wherein said change-over means includes a switch accessible exteriorly of the camera and the state of which is variable by operating the switch and by varying the state of said switch, change is performed from the film rewinding by said first rewinding means over to the film rewinding by said second rewinding means and from the film rewinding by said second rewinding means over to the film rewinding by said first means.

20. A camera according to claim 18, wherein said changeover means includes a switch accessible exteriorly of the camera and the state of which is variable by operating the switch and, by varying the state of said switch, change is performed from the film rewinding by said first rewinding means over to the film rewinding by said second rewinding means and from the film rewinding by said second rewinding means over to the film rewinding by said first means.

21. A camera according to claim 19, wherein a change in the state of said switch when said film is not being rewound commences the film rewinding.

22. A camera according to claim 17, further comprising an indication device which is arranged to indicate a speed at which the film is rewound.

23. A camera according to claim 22, wherein said indication device includes a display which is arranged within a viewfinder.

24. A camera comprising:

rewinding means for rewinding a film at least first and second film rewinding speeds, said second film rewinding speed being higher than said first film rewinding speed, and control means for forcing said film rewinding means to rewinding said film at said first film rewinding speed at the commencement of film rewinding and thereafter responsive to operator input during film rewinding for causing said film rewinding means to continue to rewind said film at said second film rewinding speed, said control means including a switch accessible exteriorly of the camera and the state of which is variable from a first state to a second state by operating the switch and the film rewinding at said first film rewinding speed being changed over to the film rewinding at said second film rewinding speed by varying the state of said switch, whereby the film rewinding by said rewinding means at said second rewinding speed is maintained even when the switch is subsequently changed from said second state to said first state.

25. A camera according to claim 24, wherein said control means is further responsive to operator input for causing said film rewinding means to change said film rewinding speed from said second film rewinding speed to said first film rewinding speed.

* * * * *

UNITED STATES PATENT AND TRADEMARK OFFICE
CERTIFICATE OF CORRECTION

PATENT NO. : 5,835,804
DATED : November 10, 1998
INVENTOR(S) : Takao Takano

It is certified that error appears in the above-identified patent and that said Letters Patent is hereby corrected as shown below:

Col. 7, line 64 delete "chance" and insert --changed--.

Signed and Sealed this

Tenth Day of August, 1999

Attest:

Q. TODD DICKINSON

Attesting Officer   Acting Commissioner of Patents and Trademarks